(12) United States Patent
Ito et al.

(10) Patent No.: US 7,399,518 B2
(45) Date of Patent: Jul. 15, 2008

(54) POLYESTER FILM

(75) Inventors: Katsuya Ito, Otsu (JP); Yukinobu Mukoyama, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/568,615

(22) PCT Filed: Aug. 3, 2004

(86) PCT No.: PCT/JP2004/011076

§ 371 (c)(1), (2), (4) Date: Sep. 18, 2006

(87) PCT Pub. No.: WO2005/017007

PCT Pub. Date: Feb. 24, 2005

(65) Prior Publication Data

US 2007/0009750 A1    Jan. 11, 2007

(30) Foreign Application Priority Data

Aug. 19, 2003 (JP) ............... 2003-295631
Aug. 19, 2003 (JP) ............... 2003-295633
Aug. 19, 2003 (JP) ............... 2003-295634
Aug. 19, 2003 (JP) ............... 2003-295636

(51) Int. Cl.
B32B 15/08   (2006.01)
B32B 15/09   (2006.01)
B32B 18/00   (2006.01)
B32B 27/08   (2006.01)
B32B 27/36   (2006.01)

(52) U.S. Cl. ............... 428/195; 428/343; 428/458; 428/480; 428/482; 528/272; 528/308; 528/308.6; 525/437; 525/444

(58) Field of Classification Search ............... None
See application file for complete search history.

(56) References Cited

U.S. PATENT DOCUMENTS

| | | | | |
|---|---|---|---|---|
| 4,798,875 A * | 1/1989 | Itoyama et al. | ............... | 525/444 |
| 5,173,357 A * | 12/1992 | Nakane et al. | ............... | 428/220 |
| 5,270,160 A * | 12/1993 | Hiraoka et al. | ............... | 430/634 |
| 5,503,953 A * | 4/1996 | Ito et al. | ............... | 430/49 |
| 5,677,024 A * | 10/1997 | Abe et al. | ............... | 428/40.1 |
| 5,747,174 A * | 5/1998 | Kimura et al. | ............... | 428/480 |
| 5,759,467 A * | 6/1998 | Carter et al. | ............... | 264/173.12 |
| 5,780,158 A * | 7/1998 | Asai et al. | ............... | 428/412 |
| RE36,287 E * | 8/1999 | Ito et al. | ............... | 430/49 |
| 6,090,898 A * | 7/2000 | Tsunekawa et al. | ............... | 525/444 |
| 6,423,396 B2 * | 7/2002 | Hashimoto | ............... | 428/141 |
| 6,517,762 B1 * | 2/2003 | Tsunekawa et al. | ............... | 264/290.2 |
| 7,022,388 B2 * | 4/2006 | Hashimoto et al. | ............... | 428/34.9 |
| 7,115,320 B2 * | 10/2006 | Tanaka et al. | ............... | 428/458 |
| 7,241,485 B2 * | 7/2007 | Osada et al. | ............... | 428/212 |

2002/0102419 A1    8/2002    Kawahara et al.

FOREIGN PATENT DOCUMENTS

| | | |
|---|---|---|
| EP | 0 579 087 A1 | 1/1994 |
| EP | 0 639 468 A1 | 2/1995 |
| EP | 0 685 509 A1 | 12/1995 |
| EP | 0 835 899 A1 | 4/1998 |
| EP | 1 072 632 A2 | 1/2001 |
| EP | 1 186 633 A2 | 3/2002 |
| JP | 60-141525 | 7/1985 |
| JP | 61-233539 | 10/1986 |
| JP | 63-037937 | 2/1988 |
| JP | 09-151265 | 6/1997 |
| JP | 2002-37993 A | 2/2002 |
| JP | 2002-179892 A | 2/2002 |
| JP | 2002-178401 | 6/2002 |
| JP | 2002-321277 A | 11/2002 |
| JP | 2003-113259 | 4/2003 |
| JP | 2004-162046 | 6/2004 |
| WO | WO 94/13464 A1 | 6/1994 |
| WO | WO 03/074611 A1 * | 9/2003 |

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*
European Search Report dated Sep. 7, 2006 issued in corresponding to European Application No. 04 74 8209.
International Search Report dated Nov. 2, 2004 of PCT/JP2004/011076.
Chinese Office Action dated Oct. 26, 2007 (mailing date), issued in corresponding Chinese Patent Application No. 2004800236061.

* cited by examiner

*Primary Examiner*—Vivian Chen
(74) *Attorney, Agent, or Firm*—Westerman, Hattori, Daniels & Adrian, LLP.

(57) ABSTRACT

The present invention provides a polyester film superior in heat resistance, chemical resistance, insulation property and thermal dimensional stability, and suitable for application to fields associated with boiling or retort treatment, which require tenacity, pinhole resistance, bending resistance, bag breakage resistance on dropping, impact resistance and the like, fields requiring thermoforming or vacuum forming, and various uses such as packaging bags for water-containing food, pharmaceutical products and the like.
[Solving Means] The polyester film characteristically shows an initial elastic modulus in at least one direction of 2.5-10 GPa, an impact strength of 40-10000 J/mm, a thermal shrinkage in at least one direction at 150° C. of −0.5% to 6%, a haze of 0.001% to 7%, and an absolute value of the difference in the thermal shrinkage between the longitudinal direction and the transverse direction of not more than 1.1%.

12 Claims, No Drawings

POLYESTER FILM

TECHNICAL FIELD

The present invention relates to a polyester film superior in thermal dimensional stability and useful for various food packages, general industrial use, optical use, electric materials, mold processing use, a constituent material of film laminated metal plate and the like.

BACKGROUND OF THE INVENTION

Films made from polyester represented by polyethylene terephthalate resin have been extensively applied to various uses in view of the mechanical property, heat resistance and the like. However, they are not suitable for some uses because of the inferiority in flexibility and molding processibility. On the other hand, since films made from polyamide represented by 6-nylon are superior in flexibility, pinhole resistance and gas barrier property, they are applied to many uses such as food packaging materials and the like. However, due to poor dimensional stability against moisture absorption, they cannot be easily applied to food packaging uses and industrial uses involving boiling treatment and retort treatment.

Therefore, a polyester film having flexibility, which is one of the features of polyamide film, has been considered. Most of these films acquire flexibility based on the use of a polyester copolymer in a part or the entirety of the constituent resin. However, since they show degraded strength and elastic modulus, which are mechanical properties, problems may occur during post-processing such as printing and the like.

In view of the above, a flexible film made from crystalline polyester has been studied and, for example, films comprising polyethylene terephthalate resin and polybutylene terephthalate resin are known (Patent References 1, 2, 3). In these films, prevention of the incidence of problems during post-processing has been tried by decreasing thermal shrinkage by conducting heat setting after completion of biaxial orientation. Since the difference in the melting points between polyethylene terephthalate resin and polybutylene terephthalate resin is about 30° C., heat shrinkage cannot be suppressed sufficiently, which in turn necessitates many limitations during post-processing.

Moreover, since these film are free of an easily adhesive coating layer, problems occur in that easily adhesive property of ink becomes degraded, stability of gas barrier property becomes defective after boiling treatment and the like, since a vapor-deposited layer formed of metal or inorganic oxide shows poor adhesion and so forth. In addition, problems of whitening and the like occur unless conditions for forming an easily adhesive coating layer are optimized.

Patent Reference 1: JP-A-2002-037993
Patent Reference 2: JP-A-2002-179892
Patent Reference 3: JP-A-2002-321277

BRIEF SUMMARY OF THE INVENTION

The present invention has been made in view of the problems of the above-mentioned conventional films, and provides a polyester film superior in mechanical strength, heat resistance, chemical resistance, insulation property and thermal dimensional stability, and suitable for application to fields associated with boiling or retort treatment, which require tenacity, pinhole resistance, bending resistance, bag breakage resistance on dropping, impact resistance and the like, fields requiring thermoforming or vacuum forming, and various uses such as packaging bags for water-containing food, pharmaceutical products and the like.

To achieve the above-mentioned object, the polyester film of the present invention has an initial elastic modulus in at least one direction of 2.5-10 GPa, an impact strength of 40-10000 J/mm, a thermal shrinkage in at least one direction at 150° C. of −0.5 to 6%, a haze of 0.001-7%, and an absolute value of the difference in the thermal shrinkage between the longitudinal direction and the transverse direction of not more than 1.1%.

In this case, the aforementioned polyester film may be made of a polyester resin composition comprising 10-90 wt % of polyethylene terephthalate resin A, and 90-10 wt % of a polybutylene terephthalate resin and/or polytrimethylene terephthalate resin B.

In this case, the reduced viscosity of the aforementioned polyester film may be not less than 0.80.

In this case, moreover, the polyester film of claim 1, wherein the absolute value of the difference in the thermal shrinkage between the longitudinal direction and the transverse direction of the aforementioned substrate film is not more than 1.1%.

In this case, moreover, the polyester film of claim 1, wherein the thermal shrinkage in the longitudinal direction and the transverse direction at 150° C. of the aforementioned substrate film is each 0-4%.

In this case, moreover, the polyester film of claim 1, wherein the number of pinholes formed by bending the substrate film 1000 times at 23° C. in a Gelbo-Flex test is not more than 5.

In this case, moreover, at least one surface treatment layer selected from a coating layer, a corona discharge treatment layer, a vapor-deposited metal layer, a vapor-deposited inorganic oxide layer and an ink printed layer can be formed on at least one surface of the aforementioned polyester film.

In this case, moreover, the polyester film of claim 6, wherein the aforementioned easily adhesive coating layer is composed of a coating solution containing at least binder (C) and hardener (D).

In this case, moreover, the polyester film of claim 6, which is obtained by applying a coating solution for forming the aforementioned easily adhesive coating layer, and then subjecting the resulting film to at least uniaxial orientation.

In this case, moreover, the aforementioned polyester film can be used as a packaging material.

The polyester film according to the present invention is superior in mechanical strength, heat resistance, chemical resistance, insulation property and thermal dimensional stability, and can be applied to fields associated with boiling or retort treatment, which require tenacity, pinhole resistance, bending resistance, bag breakage resistance on dropping, impact resistance and the like, fields requiring thermoforming or vacuum forming, and various uses such as packaging bags for water-containing food, pharmaceutical products and the like.

DETAILED DESCRIPTION OF THE INVENTION

The polyester film of the present invention has an initial elastic modulus in at least one direction of 2.5-10 GPa, preferably 2.7-10 GPa, more preferably an initial elastic modulus in the longitudinal direction and the transverse direction of 2.7-10 GPa, particularly preferably 2.7-5 GPa. When it is less than 2.5 GPa, the film may be broken during high speed printing, printing displacement may occur and handling of the film in the form of a bag becomes difficult. When it exceeds 10 GPa, the producibility of the film becomes poor.

The polyester film of the present invention shows an impact strength of 40-10000 J/mm, preferably 60-1000 J/mm, more preferably 60-200 J/mm. When it is less than 40 J/mm, the film in the form of a bag filled with the contents may gets broken when dropped and the like. When it exceeds 10000 J/mm, the producibility of the film becomes poor.

The polyester film of the present invention has a thermal shrinkage in at least one direction of −0.5% to 6%, preferably 0% to 3%, more preferably 0% to 1.5%. When it is lower than −0.5% or exceeds 6%, deformation of the film unpreferably occurs in the post-printing drying and the like.

In addition, the polyester film of the present invention has a haze of 0.001% to 7%, preferably 0.01% to 5%. A haze of less than 0.001% is difficult to achieve in view of the production steps, and the production cost becomes high. When the haze exceeds 7%, visual appearance becomes defective after back printing, thus posing problems in design.

The polyester film of the present invention shows an absolute value of the difference in the thermal shrinkage between the longitudinal direction and the transverse direction of not more than 1.1%, preferably not more than 0.9%, more preferably not more than 0.6%, further preferably not more than 0.3%. When it exceeds 1.1%, the gas barrier property after retort treatment may not be stabilized, or thermal stability may be lost, which is unpreferable. More preferably, the thermal shrinkage of the substrate film in the longitudinal direction and the transverse direction at 150° C. is 0% to 4% for each direction.

The polyester film of the present invention shows the number of pinholes of not more than 5, preferably not more than 2, more preferably 0, which are formed by bending 1000 times at 23° C. in a Gelbo-Flex test. When the number of pinholes is not less than 6 and when the film is processed into a bag filled with the contents, pinholes due to bending of the bag and the like are easily developed, sometimes resulting in a failure to function as a packaging material.

The reduced viscosity (ηsp/c) of the polyester film of the present invention is preferably not less than 0.80, more preferably not less than 0.85, still more preferably not less than 0.90. When it is less than 0.80, the impact strength decreases, and when the film is processed into a bag filled with the contents, bag breakage easily occurs.

The thickness of the polyester film of the present invention is generally 3-1000 μm, preferably 3-100 μm, more preferably 5-70 μm, particularly preferably 8-30 μm.

The polyester film of the present invention is preferably made of a polyester resin composition containing 10-90 wt % of polyethylene terephthalate resin A, and 90-10 wt % of a polybutylene terephthalate resin and/or polytrimethylene terephthalate resin B. The polyester resin composition contains polyethylene terephthalate resin A (hereinafter sometimes to be abbreviated as resin A) in a proportion of 10-90 wt %, preferably 15-70 wt %, more preferably 20-49 wt %, and a polybutylene terephthalate resin and/or polytrimethylene terephthalate resin B (hereinafter sometimes to be abbreviated as resin B) in a proportion of 90-10 wt %, preferably 85-30 wt %, more preferably 80-51 wt %. When resin A is contained in a proportion of less than 10 wt %, stretchability becomes poor due to the fast crystallization rate of resin B, causing easy breakage during film forming, and when resin A is contained in a proportion of more than 90 wt %, flexibility becomes insufficient. When resin B is contained in a proportion of less than 10 wt %, flexibility becomes insufficient, and when resin B exceeds 90 wt %, stretchability of the film becomes poor due to the fast crystallization rate of resin B, causing easy breakage during film forming.

The polyethylene terephthalate resin A to be used in the present invention preferably has a reduced viscosity of 0.55-1.20, more preferably 0.55-0.80. When the reduced viscosity is smaller than this range, a film having practical mechanical strength cannot be obtained easily, and when it exceeds this range, the film forming property of the film is unpreferably degraded.

The polyethylene terephthalate resin A to be used in the present invention is preferably made of a homopolymer mainly comprising terephthalic acid and ethylene glycol. As long as the heat resistance and other properties (crystallinity etc.) are not impaired, it may be a polyester copolymer wherein not more than 20 mol %, preferably 0.1-10 mol %, of a different acid component or a glycol component is copolymerized.

When the polyethylene terephthalate resin to be used in the present invention is a copolymer, the following monomers can be used as a copolymerizable component.

As the dicarboxylic acid usable for copolymerization, aromatic dicarboxylic acid is exemplified by isophthalic acid, orthophthalic acid, naphthalene dicarboxylic acid, biphenyl dicarboxylic acid and the like. Examples of aliphatic dicarboxylic acid include succinic acid, adipic acid, azelaic acid, sebacic acid, dodecanedioic acid, dimer acid and the like, and examples of alicyclic dicarboxylic acid include 1,4-cyclohexane dicarboxylic acid, 1,3-cyclohexane dicarboxylic acid, 1,2-cyclohexane dicarboxylic acid, acid anhydride thereof and the like. Examples of dicarboxylic acid containing a polymerizable unsaturated double bond include α,β-unsaturated dicarboxylic acid (e.g., fumaric acid, maleic acid, maleic anhydride, itaconic acid, citraconic acid), alicyclic dicarboxylic acid containing an unsaturated double bond (e.g., 2,5-norbornene dicarboxylic anhydride, tetrahydrophthalic anhydride) and the like.

As the glycol usable for copolymerization, aliphatic glycol having 3 to 10 carbon atoms, alicyclic glycol having 6 to 12 carbon atoms and ether bond-containing glycol and the like can be mentioned. As the aliphatic glycol having 3 to 10 carbon atoms, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol and the like can be mentioned. As the alicyclic glycol having 6 to 12 carbon atoms, 1,4-cyclohexanedimethanol and the like can be mentioned.

Further, as the ether bond-containing glycol, polyethylene glycol, polypropylene glycol, polytetramethylene glycol, diethylene glycol, triethylene glycol, dipropylene glycol, glycols obtained by adding ethyleneoxide or propyleneoxide to two phenolic hydroxyl groups of bisphenols (e.g., 2,2-bis(4-hydroxyethoxyphenyl)propane) and the like can be mentioned.

In addition, the polybutylene terephthalate resin and/or polytrimethylene terephthalate resin B to be used in the present invention preferably has a reduced viscosity of 0.80-2.20. When the intrinsic viscosity is smaller than this range, a film having practical mechanical strength cannot be obtained easily, and when it exceeds this range, the film forming property of the film is unpreferably degraded.

The polybutylene terephthalate resin to be used in the present invention is preferably made of a homopolymer mainly comprising terephthalic acid and butanediol. As long as the heat resistance and other properties (crystallinity etc.) are not impaired, it may be a polyester copolymer wherein not more than 20 mol %, preferably not more than 10 mol %, of a different acid component or a glycol component is copolymerized. In addition, the polytrimethylene terephthalate resin is preferably made of a homopolymer mainly comprising terephthalic acid and trimethylene glycol. As long as the heat resistance and other properties are not impaired, it may be a polyester copolymer wherein not more than 20 mol %, preferably 0.1-10 mol %, of a different acid component or a glycol component is copolymerized.

When the polybutylene terephthalate resin or polytrimethylene terephthalate resin to be used in the present invention is a copolymer, the following monomers can be used as a copolymerizable component.

As the dicarboxylic acid usable for copolymerization, various dicarboxylic acids can be mentioned. Of these, examples of aromatic dicarboxylic acid include isophthalic acid, orthophthalic acid, naphthalene dicarboxylic acid, biphenyl dicarboxylic acid and the like. Examples of aliphatic dicarboxylic acid include succinic acid, adipic acid, azelaic acid, sebacic acid, dodecanedioic acid, dimer acid and the like, and examples of alicyclic dicarboxylic acid include 1,4-cyclohexane dicarboxylic acid, 1,3-cyclohexane dicarboxylic acid, 1,2-cyclohexane dicarboxylic acid, acid anhydride thereof and the like. Examples of dicarboxylic acid containing a polymerizable unsaturated double bond include α,β-unsaturated dicarboxylic acid (e.g., fumaric acid, maleic acid, maleic anhydride, itaconic acid, citraconic acid), alicyclic dicarboxylic acid containing an unsaturated double bond (e.g., 2,5-norbornene dicarboxylic anhydride, tetrahydrophthalic anhydride) and the like.

As the glycol usable for copolymerization, aliphatic glycol having 2 to 10 carbon atoms, alicyclic glycol having 6 to 12 carbon atoms, ether bond-containing glycol and the like can be mentioned. As the aliphatic glycol having 2 to 10 carbon atoms, ethylene glycol, 1,2-propylene glycol, trimethylene glycol, 1,4-butanediol, 1,5-pentanediol, neopentyl glycol, 1,6-hexanediol, 3-methyl-1,5-pentanediol, 1,9-nonanediol, 2-ethyl-2-butylpropanediol and the like can be mentioned. As the alicyclic glycol having 6 to 12 carbon atoms, 1,4-cyclohexanedimethanol and the like can be mentioned.

Furthermore, as the ether bond-containing glycol, polyethylene glycol, polypropylene glycol, polytetramethylene glycol, diethylene glycol, triethylene glycol, dipropylene glycol, glycols obtained by adding ethylene oxide or propylene oxide to two phenolic hydroxyl groups of bisphenols (e.g., 2,2-bis (4-hydroxyethoxyphenyl)propane etc.) and the like can be mentioned.

The polyester film of the present invention can contain any amount of fine particles in a polyester resin composition constituting the polyester film. For example, silicon dioxide, kaolin, clay, calcium carbonate, calcium terephthalate, aluminum oxide, titanium oxide, calcium phosphate, silicone particles and the like can be mentioned, with preference given to inorganic lubricants. During melt mixing, additives such as stabilizer, coloring agent, antioxidant, antifoaming agent, antistatic agent and the like can be added as necessary besides lubricant.

The polyester film of the present invention should have mechanical strength. For this end, polyethylene terephthalate resin A, and polybutylene terephthalate resin and/or polytrimethylene terephthalate resin B constituting the polyester film preferably do not allow copolymerization during melt extrusion. As a method for suppressing copolymerization, (1) a method comprising adding a particular phosphorus compound to suppress transesterification reaction, (2) a method comprising controlling the size of the resin pellets to be mixed so as to prevent smooth mixing, (3) a method comprising lowering the temperature of extruder to prevent easy progression of transesterification, (4) a method comprising using an extruder having a double flight type screw so as to prevent smooth mixing of resin A and resin B, (5) a method comprising melt extrusion of resin A and resin B from two extruders each at a particular temperature, mixing them in a molten state immediately before extruding from a T-die and then extruding the mixture from the T-die and the like can be mentioned.

When a phosphorus compound is added to suppress copolymerization of polyethylene terephthalate resin A and a polybutylene terephthalate resin and/or polytrimethylene terephthalate resin B during melt extrusion, it is preferable, but not limited, to use a phosphorus compound having a melting point of not less than 200° C. and a molecular weight of not less than 200. While the optimal amount of addition varies depending on the kind of the phosphorus compound, polymerization conditions and the like, addition in a proportion of 0.01-0.3 wt % is preferable for the suppression of transesterification reaction between resin A and resin B. For use for food such as beverage can and the like, the compound and amount thereof should meet the standard of FDA (U.S. Food and Drug Administration), Japan Hygienic Olefin and Styrene Plastics Association and the like. To increase crystallization rate, it is also preferable to add a substance to be a nucleating agent for crystallization, while suppressing copolymerization.

The substance to be a nucleating agent for crystallization can be added after mixing with a plasticizer such as polyethylene, polypropylene, polystyrene, polyester polymer or polyester copolymer having a molecular weight of not more than 20000, which has the aforementioned monomer constitution, fatty acid ester and the like. As the nucleating agent for crystallization, inorganic particles of calcium carbonate, non-crystalline zeolite particles, anatase type titanium dioxide, rutile type titanium dioxide, calcium phosphate, silica, kaolin, talc, clay, barium sulfate, zinc oxide, zinc sulfide and the like can be mentioned, which are generally added in a proportion of 0.001-2 wt %, preferably 0.01-1 wt %. However, the results thereof vary drastically depending on the substances to be added, the amount of addition, means of addition, order of addition, particle size and the like, as well as the melt extrusion conditions of the film. Thus, for stable expression of the effect, it is preferable to employ a method comprising preparing master batch pellets by the addition of inorganic particles during polymerization to a polyester copolymer having a molecular weight of not more than 20000 and having the aforementioned monomer constitution, dry blending the pellets with at least the pellets of resin A and resin B to be the substrate or master batch pellets, and melting and extruding the mixture. As compared to the addition of inorganic particles to resin A and resin B during polymerization, dispersibility in a resin mixture becomes fine, which, it is considered, in turn increases crystallization rate and suppresses whitening of polyester film during boiling, retort treatment and thermoforming.

In addition, it is preferable to control the size of the resin pellets to be mixed, so as to suppress copolymerization of the polyethylene terephthalate resin A, and a polybutylene terephthalate resin and/or polytrimethylene terephthalate resin B during melt extrusion.

It is also preferable to set the temperature of each part to not more than 270° C., preferably not more than 262° C., during the period of from mixing and melting of the resins, passage through an extruder, to extrusion from a T-die, so as to suppress copolymerization of the polyethylene terephthalate resin A, and a polybutylene terephthalate resin and/or polytrimethylene terephthalate resin B during melt extrusion. The presence of a temperature zone exceeding 270° C. in a melt extrusion step is considered to accelerate decomposition of a polyester usable as resin B, which in turn promote copolymerization of resin A and resin B. When the film of the present invention is to be produced using a single extruder, in the melt extrusion step, resin A, resin B and other resin pellets constituting the aforementioned polyester resin composition are mixed, cast in an extruder, melted, extruded from a T-die, adhered to a cooling roll by an electrostatic adhesion method and the like, and solidified by cooling to give a non-oriented sheet. In this case, the temperature of an extruder is preferably set to not more than 270° C., preferably not more than 262° C., for all of the feeding part, compression part, measuring part, filter, resin flow path and T-die of the extruder.

In general, when the extrusion temperature conditions for resin are described in literatures, the resin temperature immediately before entry of the resin into a T-die or immediately after delivery of the resin from the T-die is often taken as the temperature condition of extrusion. Control of only the resin temperature immediately before entry into a T-die or immediately after delivery from the T-die is insufficient to definitely control the resin temperature during the melt extrusion step up to the T-die. It is a general practice to intentionally change the feeding part, compressing part, measuring part, filter and resin flow path of an extruder, in view of the specific condition of the machine, such as screw shape of the extruder and the like, production speed and stability, and the temperature of the respective parts is in fact often different from each other.

Furthermore, when the film of the present invention is to be produced using a single extruder, so as to suppress copolymerization of polyethylene terephthalate resin A, and a polybutylene terephthalate resin and/or polytrimethylene terephthalate resin B during melt extrusion, a uniaxial extruder having a double flight type screw compression part (compression zone), which is of a rapid compression type with a small compression ratio (not more than 2.0) is preferably used. As an extruder having a double flight type screw, UB series manufactured by Mitsubishi Heavy Industries, Ltd. can be mentioned.

To suppress copolymerization of polyethylene terephthalate resin A, and a polybutylene terephthalate resin and/or polytrimethylene terephthalate resin B during melt extrusion, moreover, resin A and resin B are respectively melted and extruded from two extruders, mixed in a molten state and immediately thereafter extruded from a T-die to give the film of the present invention. As a method for mixing in a molten state immediately before extrusion from a T-die, a method comprising feeding respective molten resins in a molten state to molten resin mixers such as extruders, static mixers and the like, melt-mixing and extruding them, and the like can be mentioned. As a device for mixing molten resins, conventional uniaxial extruder, biaxial extruder, dynamic mixer, static mixer (manufactured by Noritake Co., Limited and the like) and the like can be mentioned. As a preferable method for suppressing copolymerization of polyethylene terephthalate resin A and polytrimethylene terephthalate resin B during melt extrusion, the above-mentioned method (5), and a combination of method (5) and other method can be mentioned.

While the polyester film of the present invention can be used when it meets the requirements of a non-oriented sheet of the present invention, it can be preferably obtained by orienting a non-oriented sheet at least uniaxially, more preferably biaxially or more. The method of orientation includes tubular orientation, pantographic simultaneous biaxial orientation, linear motor simultaneous or sequential biaxial orientation, sequential biaxial orientation based on a combination of a heating roll and a tenter and the like. In the case of sequential biaxial orientation, orientation methods of longitudinal-transverse, transverse-longitudinal, longitudinal-longitudinal-transverse, longitudinal-transverse-longitudinal, longitudinal-transverse-transverse, longitudinal-longitudinal-longitudinal-transverse and the like can be mentioned.

The production method of the film of the present invention is shown below by referring to a sequential biaxial orientation method as an example. Resin chips of polyethylene terephthalate resin A, and a polybutylene terephthalate resin and/or polytrimethylene terephthalate resin B are mixed, cast into one extruder, melted, mixed and extruded. The mixture is extruded from a T-die and the melt extruded sheet is electrostatically adhered to a chill roll to give a non-oriented sheet. The temperature of the chill roll then is preferably 10-40° C. When the temperature of the chill roll exceeds 40° C., the polybutylene terephthalate resin and/or polytrimethylene terephthalate resin B crystallize to whiten the extruded sheet. As a result, haze after biaxial orientation becomes poor and the printed layer becomes difficult to see.

The obtained non-oriented sheet is delivered to a pair of orienting rolls at 50-100° C. with different speeds, drawn 2.5 to 5-fold in the longitudinal direction. The longitudinally oriented sheet is delivered to a tenter and drawn 2.5 to 5-fold in the transverse direction at 60-120° C. Where necessary, the sheet may be drawn in the longitudinal direction and the transverse direction in two steps at different temperature and different folding rate. Then, the sheet is heat set at 180-230° C. to give a polyester film.

The polyester film of the present invention shows not more than 1.1% of the difference in the absolute value of thermal shrinkage between the longitudinal direction and the transverse direction. To obtain such a polyester film, the film forming conditions are controlled. According to a conventional sequential biaxial orientation method, thermal shrinkage is suppressed by heat setting in situ in the tenter after completion of the second axial orientation, while relaxing the sheet in the transverse direction. However, since relaxing in the longitudinal direction at this point is difficult, thermal shrinkage in the longitudinal direction and that in the transverse direction often becomes different. In the present invention, a method of relaxing in the longitudinal direction with the clips of the tenter, or a method of relaxing the sheet after leaving the tenter using heating rolls having different rotation speeds is preferably employed. Since the relaxing conditions vary depending on the orientation ratio, speed and the like, individual conditions are determined. Generally preferably, the heat setting temperature is 180-230° C., the relaxing rate is 2-8%, the difference in the heat setting temperature between the longitudinal direction and the transverse direction is not more than 20° C., and the difference in the relaxing rate between the longitudinal direction and the transverse direction is within 2% (e.g., when the relaxing rate in the transverse direction is set for 4% that in the longitudinal direction is set to 2-6%).

The substrate film used for forming the polyester film of the present invention preferably has an easily adhesive coating layer, preferably an easily adhesive coating layer comprising binder C and hardener D, on at least one surface thereof. When an easily adhesive coating layer is not formed, adhesiveness of the printing ink may be degraded, and adhesion of a metal or inorganic oxide vapor-deposited layer becomes insufficient, thus degrading the stability of gas barrier property. Particularly, when bags filled with food or liquid are sealed, and many of such bags are boil-treated with circulation during a boiling treatment, a vapor-deposited layer is easily detached in the absence of an easily adhesive coating layer, and the gas barrier property becomes unstable.

The polyester film of the present invention can have at least one surface treatment layer selected from a surface activation treated layer, a vapor-deposited metal layer, a vapor-deposited inorganic oxide layer and a printed ink layer on at least one surface thereof, besides the coating layer or on the coating layer. In the present invention, these layers may be formed on one surface of the film or both surfaces thereof, which can be appropriately determined according to use. The absolute value of the difference in the thermal shrinkage between the longitudinal direction and the transverse direction of the polyester film having such a surface treatment layer is not more than 1.1%, preferably not more than 0.9%, more preferably not more than 0.6%, and still more preferably not more than 0.3%. When it exceeds 1.1%, gas barrier property after retort treatment may become unstable and the thermal stability may be lost, which are unpreferable.

In the present invention, a coating agent for forming a coating layer on at least one surface of a polyester film is not particularly limited as long as it has adhesiveness. Examples thereof include coating agents made of polyester resin, polyurethane resin, polyacryl resin, polyvinyl alcohol resin and copolymers thereof, ethylene-vinyl acetate copolymer resin and the like. To improve adhesion between a polyester film and ink, a vapor-deposited layer and the like, a polyester resin coating agent is preferably used. One-component or two-component polyurethane resin coating agents are also preferable. Specific examples of the two-component polyurethane coating agent include product name Takerak A2027 and Takenate A3 (both manufactured by Takeda Pharmaceutical Company Ltd.). As the polyester resin coating agent, product name VYLON (manufactured by Toyo Boseki Kabushiki Kaisha) and a water-insoluble polyester copolymer obtained by reacting mixed dicarboxylic acid of metal sulfonate group-containing dicarboxylic acid (0.5-15 mol %) and dicarboxylic acid free of metal sulfonate group (85-99.5 mol %) with a polyol component can be mentioned. As the above-mentioned metal sulfonate group-containing dicarboxylic acid, metal salts such as 5-sulfoisophthalic acid, 4-sulfophthalic acid, 4-sulfonaphthalene-2,7-dicarboxylic acid, 5[4-sulfophenoxy]isophthalic acid and the like can be mentioned. Particularly preferred are sodium 5-sulfoisophthalate and sodium sulfoterephthalate. The metal sulfonate group-containing dicarboxylic acid component is used in a proportion of 0.5-15 mol %, desirably 2.0-10 mol %, relative to the entire dicarboxylic acid component. When it exceeds 15 mol %, dispersibility in water is improved but water resistance of polyester copolymer is markedly degraded, and when it is less than 0.5 mol %, dispersibility in water is markedly degraded. While the dispersibility of the polyester copolymer in water varies depending on the kind, mixing ratio and the like of the copolymerization component, the above-mentioned metal sulfonate group-containing dicarboxylic acid is preferably used in a small amount as long as its dispersibility in water is not impaired. As the dicarboxylic acid free of metal sulfonate group, aromatic, alicyclic and aliphatic dicarboxylic acids can be used. As the aromatic dicarboxylic acid, terephthalic acid, isophthalic acid, orthophthalic acid, 2,6-naphthalene dicarboxylic acid and the like can be mentioned. The aromatic dicarboxylic acid is preferably used in a proportion of not less than 40 mol % of the entire dicarboxylic acid component. When it is less than 40 mol %, the mechanical strength and water resistance of the polyester copolymer decreases. As the aliphatic and alicyclic dicarboxylic acids, succinic acid, adipic acid, sebacic acid, 1,3-cyclohexane dicarboxylic acid, 1,4-cyclohexane dicarboxylic acid and the like can be mentioned. Addition of these non-aromatic dicarboxylic acid component sometimes results in improved adhesiveness, but it generally degrades mechanical strength and water resistance of the polyester copolymer. The polyol component to be reacted with the above-mentioned mixed dicarboxylic acid is aliphatic glycol having 2 to 8 carbon atoms or alicyclic glycol having 6 to 12 carbon atoms. Specific examples thereof include ethylene glycol, 1,2-propylene glycol, 1,3-propanediol, 1,4-butanediol, neopentyl glycol, 1,6-hexanediol, 1,2-cyclohexanedimethanol, 1,3-cyclohexanedimethanol, 1,4-cyclohexanedimethanol, P-xylylene glycol, diethylene glycol, triethylene glycol and the like. As polyether, polyethylene glycol, polypropylene glycol, polytetramethylene glycol and the like can be mentioned. In addition, an oxycarboxylic acid component such as p-oxyethoxybenzoic acid may be copolymerized.

As the polyester resin, a polyester graft copolymer can also be used. In the present invention, the "graft formation" means introduction of a branch polymer made of a polymer other than the main chain into a branch polymer main chain.

(Polyester Graft Copolymer)

The graft polymerization is generally carried out by reacting a hydrophobic copolymerizable polyester resin dissolved in an organic solvent with at least one kind of polymerizable unsaturated monomer using a radical initiator. The reaction product after completion of the grafting reaction includes a desired graft copolymer of hydrophobic copolymerizable polyester and polymerizable unsaturated monomer, hydrophobic copolymerizable polyester resin free from graft formation and the above-mentioned unsaturated monomer polymer not grafted to the hydrophobic copolymerizable polyester. The polyester graft copolymer in the present invention means not only the above-mentioned polyester graft copolymer but also a reaction mixture containing hydrophobic copolymerizable polyester unreactive therewith, polymer of unsaturated monomer not grafted thereto and the like.

In the present invention, polyester graft copolymer obtained by graft polymerization of hydrophobic copolymerizable polyester resin and at least one kind of polymerizable unsaturated monomer preferably has an acid value of not less than 600 eq/$10^6$ g, more preferably not less than 1200 eq/$10^6$ g. When the graft copolymer has an acid value of less than 600 eq/$10^6$ g, adhesion of the object graft copolymer-containing layer of the present invention to a layer covered therewith does not become sufficient.

The weight ratio of the hydrophobic copolymerizable polyester resin and the polymerizable unsaturated monomer, which affords a desirable graft copolymer is desirably within the range of polyester/polymerizable unsaturated monomer=40/60-95/5, more desirably 55/45-93/7, most desirably 60/40-90/10. When the weight ratio of the hydrophobic copolymerizable polyester resin is less than 40 wt %, superior adhesiveness of the polyester resin cannot be exhibited. On the other hand, when the weight ratio of the hydrophobic copolymerizable polyester resin is greater than 95 wt %, the defect of the polyester resin, i.e., blocking, easily occurs.

The polyester graft copolymer to be used in the present invention is in the form of a solution or dispersion in an organic solvent, or a solution or dispersion in an aqueous solvent. Particularly, a dispersion in an aqueous solvent, namely, an aqueous resin dispersion, is preferable in terms of work environment and coatability. Such aqueous dispersion resin can be generally obtained by graft polymerization of the aforementioned hydrophobic copolymerizable polyester resin with at least one kind of hydrophilic polymerizable unsaturated monomer in an organic solvent, adding water and evaporating the organic solvent.

The above-mentioned polyester graft copolymer preferably shows an average particle size of not more than 500 nm, particularly 10-500 nm, as measured by a laser scattering method, and a semitransparent to opalescent appearance. Graft copolymers having various particle sizes can be obtained by controlling the polymerization method. The average particle size is preferably not more than 400 nm, more preferably not more than 300 nm, from the aspect of dispersion stability. When it exceeds 500 nm, the gloss of the surface of a coated film is degraded and so is the transparency. When it is less than 10 nm, the object water resistance of the present invention is unpreferably degraded.

The polymerizable unsaturated monomer grafted to a hydrophobic copolymerizable polyester resin is a hydrophilic radical polymerizable monomer, which has a hydrophilic group or a group capable converting to a hydrophilic group later. As the hydrophilic group, carboxyl group, hydroxyl group, phosphoric acid group, phosphorous acid group, sulfonic acid group, amide group, quaternary ammonium salt group and the like can be mentioned. As a group capable of converting to a hydrophilic group, acid anhydride group, glycidyl group, chloro group and the like can be mentioned. Of these groups, a carboxyl group is preferable in view of the aqueous dispersibility and increased acid value of a graft copolymer. Thus, a polymerizable unsaturated monomer having a carboxyl group or a group capable of converting to a carboxyl group is preferable.

The glass transition temperature of the polyester graft copolymer is not more than 30° C., preferably not more than 10° C. Use of a polyester graft copolymer having a glass transition temperature of not more than 30° C. for the graft copolymer-containing layer affords a polyester film superior in adhesiveness. When the properties of the graft copolymer are outside the above-mentioned range, the effect of a graft copolymer-containing layer comprising a graft copolymer is not easily exhibited.

(Hydrophobic Copolymerizable Polyester Resin)

In the present invention, the hydrophobic copolymerizable polyester resin should be essentially water insoluble, which means that the resin does not disperse or dissolve in water by itself. When a polyester resin that is dispersed or dissolved in water is used for graft polymerization, the object adhesiveness and water resistance of the present invention are degraded. The composition of the dicarboxylic acid component of the hydrophobic copolymerizable polyester resin is preferably aromatic dicarboxylic acid 60-99.5 mol % aliphatic dicarboxylic acid and/or alicyclic dicarboxylic acid 0-40 mol %, dicarboxylic acid having a polymerizable unsaturated double bond 0.5-10 mol %. When the proportion of the aromatic dicarboxylic acid is less than 60 mol % or aliphatic dicarboxylic acid and/or alicyclic dicarboxylic acid are/is more than 40 mol %, the adhesion strength decreases.

When the proportion of the dicarboxylic acid having a polymerizable unsaturated double bond is less than 0.5 mol %, grafting of a polymerizable unsaturated monomer to a hydrophobic copolymerizable polyester resin does not proceed efficiently, and when it exceeds 10 mol %, the viscosity markedly increases after grafting reaction to unpreferably prevents uniform progress of the reaction. More preferably, the proportion of the aromatic dicarboxylic acid is 70-98 mol %, the proportion of the aliphatic dicarboxylic acid and/or alicyclic dicarboxylic acid is 0-30 mol %, and the proportion of the dicarboxylic acid having a polymerizable unsaturated double bond is 2-7 mol %.

The urethane resin U usable in the present invention as binder C for forming an easily adhesive coating layer is heat reactive water-soluble urethane wherein a terminal isocyanate group is blocked with a hydrophilic group. As blocking agent for isocyanate group, a number of compounds such as bisulphites, and phenols, alcohols, lactams, oximes and active methylene compounds, each containing a sulfone group, and the like can be used. The blocked isocyanate group can be removed by making the urethane prepolymer hydrophilic or water soluble, and the blocking agent can be removed by drying or heat setting during film production and the like. When thermal energy is applied to the resin U having a blocked isocyanate group, the blocking agent is released from the isocyanate group and the resin U is self-crosslinked. Since resin U used for preparing a coating solution is hydrophilic, water resistance becomes poor. However, after coating, drying and heat setting to complete the thermal reaction, a coated film having fine water resistance can be obtained since the hydrophilic group of the urethane resin U is released. Of the above-mentioned blocking agents, one having adequate heat treatment temperature and heat treatment time and permitting industrial wide use, bisulphites are preferable. As the chemical composition of a urethane prepolymer usable for the above-mentioned resin U, (1) a compound having not less than two active hydrogen atoms in a molecule and a molecular weight of 200-20,000, (2) organic polyisocyanate having not less than two isocyanate groups in a molecule, and, in some cases, (3) a compound having a terminal isocyanate group obtained by reacting a chain extender having at least two active hydrogen atoms in a molecule can be mentioned. As the compound of the above-mentioned (1), compounds having not less than two hydroxyl groups, carboxyl groups, amino groups or mercapto groups in the terminal or in a molecule are generally known, and as particularly preferable compounds, polyether polyol, polyester polyol, polyetherester polyol and the like can be mentioned. As the polyether polyol, for example, alkylene oxides (e.g., ethylene oxide and propylene oxide), a compound wherein styrene oxide, epichlorohydrin and the like are polymerized, a compound obtained by random copolymerization, block copolymerization or addition polymerization to polyol thereof, and the like can be mentioned. As the polyester polyol and polyetherester polyol, linear or branched compounds can be mainly mentioned. They can be obtained by condensation with succinic acid, adipic acid, phthalic acid, acid anhydride and the like, saturated or unsaturated alcohols (e.g., ethylene glycol, diethylene glycol, 1,4-butanediol, neopentyl glycol, 1,6-hexanediol, trimethylolpropane etc.), polyalkyleneether glycols having relatively low molecular weight (e.g., polyethylene glycol, polypropylene glycol etc.), or mixtures thereof. In addition, polyesters obtained from lactone and hydroxy acid can also be used as polyester polyol, and polyether esters obtained by adding ethylene oxide, propylene oxide and the like to polyesters produced in advance can also be used as polyetherester polyol. As the organic polyisocyanate of the above-mentioned (2), isomers of toluylene diisocyanate, aromatic diisocyanates (e.g., 4,4-diphenylmethane diisocyanate etc.), aromatic aliphatic diisocyanates (e.g., xylylene diisocyanate etc.), alicyclic diisocyanates (e.g., isophorone diisocyanate, 4,4-dicyclohexylmethane diisocyanate etc.), aliphatic diisocyanates (e.g., hexamethylene diisocyanate, 2,2,4-trimethylhexamethylene diisocyanate etc.), and polyisocyanates obtained by addition of trimethylolpropane and the like to these compounds (single or multiple) can be mentioned. As the chain extender having at least two active hydrogens of the above-mentioned (3), glycols (e.g., ethylene glycol, diethylene glycol, 1,4-butanediol, 1,6-hexanediol etc.), polyols (e.g., glycerol, trimethylolpropane, pentaerythritol etc.), diamines (e.g., ethylenediamine, hexamethylenediamine, piperazine etc.), amino alcohols (e.g., monoethanolamine, diethanolamine etc.), thiodiglycols (e.g., thiodiethylene glycol etc.), and water can be mentioned.

In addition, the polyacryl resin can be obtained by polymerization of acrylic acid or a derivative thereof and, where necessary, a monomer other than acrylic acid (derivative) and having a vinyl group. As the monomer to be used, for example, acrylic acid, methacrylic acid (hereinafter (meth) acrylic acid includes acrylic acid and/or methacrylic acid), lower alkyl ester of (meth)acrylic acid (e.g., methyl, ethyl, propyl, butyl, amyl, hexyl, heptyl, octyl, 2-ethylhexyl ester), methyl methacrylate, hydroxymethyl acrylate, styrene, glycidyl methacrylate, methyl acrylate, ethyl acrylate and the like can be mentioned.

In the present invention, the easily adhesive coating layer preferably contains hardener D. As the hardener D, a phenol formaldehyde resin which is a condensate of alkylated phenols with formaldehyde, cresols etc. with formaldehyde; addition product of urea, melamine, benzoguanamine etc. with formaldehyde, an amino resin comprising the addition product and an alkyl ether compound comprising an alcohol having 1 to 6 carbon atoms; a multifunctional epoxy compound; a multifunctional isocyanate compound; a block isocyanate compound; a multifunctional aziridine compound; an oxazoline compound and the like can be used. As the phenol formaldehyde resin, for example, condensates of phenols such as alkylated (methyl, ethyl, propyl, isopropyl or butyl) phenol, p-tert-amylphenol, 4,4'-sec-butylidenephenol, p-tert-butylphenol, o-, m-, p-cresol, p-cyclohexylphenol, 4,4'-isopropylidenephenol, p-nonylphenol, p-octylphenol, 3-pentadecylphenol, phenol, phenylo-cresol, p-phenylphenol, xylenol and the like and formaldehyde can be mentioned.

As the amino resin, for example, methoxymethylol urea, methoxymethylol N,N-ethyleneurea, methoxymethylol dicianediamide, methoxymethylol melamine, methoxymethylol benzoguanamine, butoxymethylol melamine, butoxymethylol benzoguanamine and the like can be mentioned, with preference given to methoxymethylol melamine, butoxymethylol melamine, methylol benzoguanamine and the like can be mentioned.

As the multifunctional epoxy compound, for example, diglycidyl ether of bisphenol A and oligomer thereof, diglycidyl ether of hydrogenated bisphenol A and oligomer thereof, diglycidyl orthophthalate, diglycidyl isophthalate, diglycidyl terephthalate, diglycidyl p-oxybenzoate, diglycidyl tetrahydrophthalate, diglycidyl hexahydrophthalate, diglycidyl succinate, diglycidyl adipate, diglycidyl sebacate, ethyleneglycol diglycidyl ether, propyleneglycol diglycidyl ether, 1,4-butanediol diglycidyl ether, 1,6-hexanediol diglycidyl ether and polyalkyleneglycol diglycidyl ethers, triglycidyl trimellitate, triglycidylisocyanurate, 1,4-diglycidyloxybenzene, diglycidylpropyleneurea, glycerol triglycidyl ether, trimethylolpropane triglycidyl ether, pentaerythritol triglycidyl ether, triglycidyl ether of glycerolalkyleneoxide adduct and the like can be mentioned.

As the multifunctional isocyanate compound, low molecular weight or high molecular weight aromatic or aliphatic diisocyanate, and polyisocyanate of trivalent or more can be used. As the polyisocyanate, tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and trimers of these isocyanate compounds can be mentioned. In addition, a terminal isocyanate group-containing compound obtained by reacting the above isocyanate compound in an excess amount and a low molecular weight active hydrogen compound (e.g., ethylene glycol, propylene glycol, trimethylolpropane, glycerol, sorbitol, ethylenediamine, monoethanolamine, diethanolamine, triethanolamine etc.) or a high molecular weight active hydrogen compound such as polyesterpolyols, polyetherpolyols, polyamides and the like can be mentioned.

The blocked isocyanate can be prepared by addition reaction of the above-mentioned isocyanate compound and a blocking agent by a conventionally known appropriate method. As the isocyanate blocking agent, for example, phenols such as phenol, cresol, xylenol, resorcinol, nitrophenol, chlorophenol etc.; thiophenols such as thiophenol, methylthiophenol etc.; oximes such as acetoxime, methylethylketoxime, cyclohexanoneoxime etc.; alcohols such as methanol, ethanol, propanol, butanol etc.; halogen-substituted alcohols such as ethylenechlorohydrin, 1,3-dichloro-2-propanol etc.; tertiary alcohols such as t-butanol, t-pentanol etc.; lactams such as ε-caprolactam, δ-valerolactam, ν-butyrolactam, β-propyllactam etc.; aromatic amines; imides; active methylene compounds such as acetylacetone, acetoacetic ester, ethyl malonate etc.; mercaptans; imines; ureas; diaryl compounds; sodium bisulfite and the like can be mentioned.

These crosslinking agents D can be used alone or a combination of two or more kinds thereof. The amount of the crosslinking agent D to be added is preferably 10-150 parts by weight, more preferably 20-120 parts by weight, per 100 parts by weights of binder C. When it is less than 10 parts by weight, a sufficient crosslinking effect is not expressed. Therefore, delamination and breakage of vapor-deposited film occur during boiling treatment and the gas barrier property after boiling treatment becomes defective. When it exceeds 150 parts by weight, drawing after coating becomes difficult and a film having an easily adhesive coating layer becomes difficult to obtain.

In the present invention, the easily adhesive coating layer may contain particles, antistatic agent, surfactant, antioxidant, light shielding agent, antigelling agent and the like.

In the present invention, to prevent degradation of water resistance of the easily adhesive coating layer and gas barrier property after boiling treatment due to delamination and breakage of vapor-deposited film during boiling treatment, which is caused by hardener D or self-crosslinking type resin, sufficient heat needs to be applied to perform crosslinking. However, when a film after the completion of biaxial orientation is to be coated, the heat sufficient for crosslinking is difficult to apply in view of the stability of a substrate film used for forming a polyester film. Therefore, coating within the film forming step is preferable, where crosslinking can be carried out simultaneously with the heat setting of the film, and a method comprising coating a sheet after uniaxial orientation is more preferable.

In the present invention, preferable combination of binder C and crosslinking agent D is a polyester resin copolymer and a melamine resin, a polyvinyl alcohol resin and a melamine resin, a polyester resin copolymer or an isocyanate resin, which is contained at least in the easily adhesive coating layer. A polyester graft copolymer that performs self-crosslinking can be used without a crosslinking agent, and is preferable in view of producibility, blocking resistance and slippery property.

In the present invention, to simultaneously improve haze, film forming stability and water resistance of the easily adhesive coating layer and gas barrier property thereof after boiling treatment, which may be impaired by delamination and breakage of a vapor-deposited film during boiling treatment, a coating solution applied to a uniaxial orientation sheet is preferably led to a tenter after drying. Since the polybutylene terephthalate resin and the polytriethylene terephthalate resin show a slower crystallization rate as compared to a polyethylene terephthalate resin, the transverse orientation temperature and the preheating temperature immediately before that need to be set higher, when the coating solution is led to a tenter without drying, which causes easy occurrence of whitening due to crystallization (high haze) and breakage of the film. Therefore, an easily adhesive coating layer is preferably dried at 40-100° C. after coating. When it exceeds 100° C., crystallization of a uniaxial orientation sheet becomes noticeable and whitening and breakage are often caused. When it is less than 40° C., drying tends to become insufficient.

In addition, and the rate of hot air is preferably controlled in consideration of the producibility, and the stability of an easily adhesive coating layer. While it depends on the machine and a film forming rate, a hot air is preferably applied at 15-25 m/sec.

The substrate film used for forming the polyester film of the present invention has a reduced viscosity of preferably 0.70-1.50, more preferably 0.80-1.10. When it is less than 0.70, insufficient flexibility leads to easy breakage of the vapor-deposited layer of metal or inorganic oxide during practical use and the gas barrier lacks stability. When it exceeds 1.50, breakage unpreferably occurs frequently in the orientation step of the film.

In the present invention, a coating layer can contain fine particles, antistatic agent, surfactant, antioxidant, light shielding agent, antigelling agent and the like. As the fine particles, for example, inorganic particles having a particle size of about 0.01-10 μm, such as calcium carbonate, sedimentary barium carbonate, silica, talc and the like, and organic particles such as polystyrene, polyester, melamine, benzoguanamine, acrylic particles and the like can be mentioned.

In the present invention, when a coating layer is to be formed on at least one surface of a polyester film, a preferable method preferably comprises applying a coating solution to a uniaxially oriented sheet, and feeding the sheet to a tenter and drawing the sheet in the perpendicular direction, thereby simultaneously preventing degradation of film forming stability and transparency, maintaining water resistance of the coating layer, preventing delamination and breakage of vapor-deposited film during boiling treatment, and preventing degradation of gas barrier property after boiling treatment. In this case, it is preferable to apply a coating solution to a uniaxially oriented sheet, dry the sheet and then lead the sheet to a tenter. Since the polybutylene terephthalate resin and the polytrimethylene terephthalate resin show a faster crystallization rate as compared to a polyethylene terephthalate resin, the transverse orientation temperature and the preheating temperature before that need to be set higher, when the coating solution is led to a tenter without drying, which causes easy occurrence of whitening due to crystallization (high haze) and breakage of the film. Therefore, a coating layer is preferably dried at not less than 40° C. and not more than 70° C. after coating. When it exceeds 70° C., crystallization of uniaxially oriented sheet begins, which easily cause whitening and breakage. When it is less than 40° C., drying tends to become insufficient.

As a method for forming a coating layer in the present invention, conventional coating methods can be used. For example, gravure coating, micro gravure coating, bar coating, reverse roll coating, reverse kissroll coating, comma coating, dam coating, curtain coating, dip coating, blade coating and the like can be employed.

In addition, a surface activation treated (e.g., corona discharge treatment) layer can be formed on at least one surface of the polyester film of the present invention. Since such surface modification means modification of the polar group on the film surface, the wetting property of the film surface can be improved, and when the wetting tension of the surface of the surface activation treated layer is set to not less than 35 dyne/cm, ink absence during printing can be reduced.

A vapor-deposited metal layer can be formed on at least one surface of the polyester film of the present invention. As a metal preferable for forming a vapor-deposited metal layer, aluminum, palladium, zinc, nickel, gold, silver, copper, indium, tin, chrome, titanium and the like can be mentioned. Representatively, aluminum is used.

A vapor-deposited inorganic oxide layer can be formed on at least one surface of the polyester film of the present invention. As an inorganic oxide preferable for forming a vapor-deposited inorganic oxide layer in the present invention, any can be used as long as a vapor-deposited layer of an. inorganic oxide, which shows transparency and gas barrier property, can be formed. Metal oxides and nonmetal oxides are widely used, and particularly, a vapor-deposited layer comprising silicon oxide and/or aluminum oxide as main components is preferable.

While the film thickness of the vapor-deposited layer of a metal or inorganic oxide is not limited and may be any, it is within the range of generally 10-5000 Å, more preferably 50-2000 Å.

A vapor-deposited layer of a metal or inorganic oxide can be formed by physical vapor deposition methods such as vacuum vapor deposition, sputtering, ion plating and the like, chemical vapor deposition methods such as CVD and the like, and the like as appropriate. As a heating method employed here, resistance heating, induction heating, electron beam heating and the like can be employed as appropriate. As a reaction gas, oxygen, nitrogen, hydrogen, argon, carbon gas, water vapor and the like can be introduced, or reactive vapor deposition using ozone addition, ion assist etc. may be employed. In addition, bias may be applied to a substrate, and film forming conditions such as heating and cooling of a substrate, may be changed. Such vapor deposition material, reaction gas, substrate bias, and heating and cooling conditions can be changed in the same manner when performing sputtering or CVD. The surface of a vapor deposited substrate may be subjected to a corona discharge treatment, a flame treatment, a low temperature plasma treatment, a glow discharge treatment, a reverse sputtering treatment, a surface roughening treatment and the like, before or during vapor deposition with a metal or inorganic oxide, thereby still more increasing the adhesion strength of a metal or inorganic oxide effectively.

In addition, the polyester film of the present invention can have a printed ink layer formed on at least one surface thereof. As the printing ink used for forming a printed ink layer is one generally used, such as an ink comprising a coloring material comprising a pigment or dye, a binder and a volatile organic solvent as constituent components. When light, particularly UV, is to be blocked with the printed ink layer, an ink layer having UV blocking property is formed. A printed ink layer can be formed by any method from gravure printing, offset printing, screen printing or other printing method, which is determined according to the film thickness, size, continuous or sheet feeding, and the like. Most generally, a printed ink layer is formed on a continuous film by gravure printing or offset printing.

In general, after forming a printed ink layer on a polyester film, a thermally adhesive resin layer is laminated or applied on a surface opposite to the surface in contact with the polyester film of the printed ink layer. After printing, therefore, a method comprising continuously laminating a thermally adhesive resin layer is most efficient and advantageous in terms of cost.

The polyester film of the present invention can be effectively utilized for use for which a nylon film is conventionally employed, which is specifically a food packaging material requiring pinhole resistance and bag breakage resistance, particularly, a food packaging material for fish processed products involving a boiling treatment or a retort treatment, pickles, daily dishes, livestock meat processed products and the like, based on the superiority of polyester in the heat resistance and moisture absorption dimensional stability. Moreover, it can be effectively utilized as packaging for industrial materials such as infusion pack, semiconductor, pet food, agricultural chemicals, fertilizers, precision equipment and the like, as well as medical, electronic, agricultural, mechanical products and the like. In addition, it can be effectively utilized as a material of packaging involving vacuum forming and air pressure forming, such as molded containers and the like, and a material of cards and electronic equipment cases, taking advantage of heat resistance, impact resistance and crystallization properties.

EXAMPLES

The present invention is explained in detail in the following by referring to Examples. Each property value in the present invention was measured as shown below.

1. Reduced Viscosity

Reduced viscosity ($\eta sp/c$)

A polymer (0.125 g) was dissolved in phenol/tetrachloroethane=6/4 (weight ratio) (25 mL) and measurement was performed at 25° C. with a Ubbelohde viscometer. The unit was dL/g. The resin was in the form of chips, and the film was cut finely and used for the measurement.

2. Initial Elastic Modulus

The measurement was performed according to JIS-K7127-1989 using Autograph (manufactured by Shimadzu Corporation: AG-5000 A).

3. Thermal Shrinkage

A sample was cut into 10 mm×150 mm, and gauge lines were marked at 100 mm intervals on 10 sample pieces. They were left standing in a gear oven at 150° C. for 30 min. without a load, after which they were taken out and the distance between gauge lines was measured at room temperature. The values were determined according to the following formula and an average value of 10 sample pieces was taken as the thermal shrinkage (%) of each sample.

thermal shrinkage=$((A-B)/A) \times 100$

A: distance between gauge lines before heating
B: distance between gauge lines after heating 4. Difference in Thermal Shrinkage An absolute value (%) of the difference between the values of thermal shrinkage in the longitudinal direction of the film and that in the transverse direction thereof was taken as the difference in the thermal shrinkage.

difference in thermal shrinkage=$|C-D|$

C: thermal shrinkage in the longitudinal direction
D: thermal shrinkage in the transverse direction 5. Haze The measurement was performed based on JIS-K-7105-1981 and using a turbidity meter (manufactured by Nippon Denshoku Industries Co., Ltd.: NDH2000), and the value of haze (HZ) shown thereon was used.

6. Impact Strength

Using a film impact tester (manufactured by Toyo Seiki Seisaku-sho, LTD.: serial number T-84-3), a measurement film was pressed with a clamp, thrust a ½ inch diameter hemisphere impacting head thereinto, and the impact strength of the sample was measured. Ten film samples were prepared, and the impact strength was measured for 5 films at a time, changing the surface to be subjected to the impact. The sample was cut into 100 mm×100 mm or more, and the ring that pressed the sample had an inner diameter of 30 mm. Average values of the impact strength of sample pieces were determined, and converted to those per 1 mm of thickness to give the impact strength (J/mm) of the film.

7. Gas Barrier Property

As a vapor deposition source, particles (about 3-5 mm in size) of $Al_2O_3$ (purity 99.5%) and $SiO_2$ (purity 99.9%) were used. An adhesion modification layer having a solid content of 0.3 g/m² (layer formed by applying a mixture of a polyester resin aqueous dispersion (100 parts by weight, manufactured by Toyo Boseki Kabushiki. Kaisha: MD1200: solid content 30 wt %), methyl melamine (40 parts by weight, manufactured by Sumitomo Chemical Co., Ltd.: M-30W), water (410 parts by weight) and isopropyl alcohol (50 parts by weight) with a wire bar and drying at 160° C. for 1 min) was formed on only one surface of the polyester films obtained in Examples and Comparative Examples. The films were fed to a vacuum vapor deposition apparatus. The inside of the chamber was maintained at a pressure of $1.5 \times 10^{-5}$ Torr, and a mixture of inorganic oxides of $SiO_2$ (70 wt %) and $Al_2O_3$ (30 wt %) was evaporated by electron beam heating (15 kw) to form a colorless, transparent vapor-deposited inorganic layer having a thickness of 220 Å on the adhesion modification layer.

Thereafter, the oxygen transmission rate was measured using an oxygen transmission rate measurement apparatus (manufactured by ModernContorols: OX-TRAN 10/50A) at humidity 50%, temperature 25° C., wherein the unit was mL/(m²·MPa·24 hours). The water vapor transmission rate was measured using a water vapor transmission rate measurement apparatus (manufactured by ModernContorols: PERMATRAN) at humidity 0%, temperature 25° C., wherein the unit was g/(m²·24 hours). In view of food packaging, an oxygen level of not more than 50 mL/(m²·MPa·24 hours) was accepted and water vapor of not more than 5.0 g/(m²·24 hours) was accepted.

8. Gas Barrier Property After Boiling Treatment

The samples (10 sheets, 15 cm×15 cm) having a vapor-deposited layer formed by the method of the above-mentioned (7.) were prepared, and immersed in hot water at 95° C. for 30 min. with stirring in a 3 L container. The samples were left standing at 23° C., 65 RH % for 24 hr and the oxygen transmission rate and the water vapor transmission rate were measured in the same manner as in (6.). In view of food packaging, an oxygen level of not more than 50 mL/(m²·MPa·24 hours) was accepted and water vapor of not more than 10 g/(m²·24 hours) was accepted.

9. Gas Barrier Property After Retort Treatment

A sample having a vapor-deposited layer formed by the method of the above-mentioned (7.) was treated in an autoclave at 125° C. for 30 min., left standing at 23° C., RH 65% for 24 hr and the oxygen transmission rate and the water vapor transmission rate were measured in the same manner as above. In view of food packaging, an oxygen level of not more than 50 mL/(m²·MPa·24 hours) was accepted and water vapor of not more than 10 g/(m²·24 hours) was accepted.

10. Whitening After Retort Treatment

After the test of 8, a fine appearance free of whitening was marked with ○ and whitened appearance with insufficient transparency was marked with x.

11. Vision of Printed Matter

Using a three color gravure printer manufactured by Modern Machinery, Ltd., blue, red and white of gravure ink "UNI-VURE A" manufactured by Dainippon Ink and Chemicals Incorporated were sequentially printed on one surface of the obtained polyester film having a vapor-deposited layer or coating layer by gravure printing, and when the vision from the back was clear, ○ was indicated and when the vision was not clear, x was indicated. The printing was performed at a rate of 50 m/min, drying temperature 90° C.

12. Gelbo Test Evaluation

In a Gelbo-Flex tester (manufactured by TESTER SANGYO CO., LTD., serial number 27793), the ambient temperature was set to 23° C., a sample film (distance between chucks 178 mm, diameter 89 mmφ) was subjected to repetitive (1000 cycles) strain under the conditions of twisting angle 440°, stroke length 155 mm, and the number of pinholes after the twisting treatment was counted (the number of ink penetration on the filter paper was counted). Five sample pieces were subjected to the measurement, and the numbers of the obtained pinholes were averaged and the average pinhole number was taken as the number of pinholes, based on which the pinhole resistance was compared.

13. Bag Dropping Test

As a sealant film, a nonoriented polypropylene film (manufactured by Toyo Boseki Kabushiki Kaisha: P1153: 50 μm) was dry laminated on the obtained polyester film, and four sides were sealed with an impulse sealer. Ten bags (150 mm×150 mm) containing water were produced, subjected to a retort treatment at 125° C. for 30 min. The bags were dropped 20 times from a height of 1 m at 5° C. The average number of droppings before incidence of bag breakage or water leakage was employed. Preferably, the number is not less than 10, more preferably not less than 15. When it is less than practical problems are caused in the transportation of packages.

14. Boiling Test

As a sealant film, a nonoriented polypropylene film (manufactured by Toyo Boseki Kabushiki Kaisha: P1153: 50 μm) was dry laminated on the obtained polyester film, and four sides were sealed with an impulse sealer. Bags (150 mm×150 mm) containing water were produced, immersed in hot water at 95° C. for 30 min. The presence or absence of bag breakage and defective appearance of the bag surface (wrinkle, whitening) was evaluated.

15. Retort Test

As a sealant film, a nonoriented polypropylene film (manufactured by Toyo Boseki Kabushiki Kaisha: P1153: 50 μm) was dry laminated on the obtained polyester film, and four sides were sealed with an impulse sealer. Bags (150 mm×150 mm) filled with water were produced, subjected to a retort treatment at 120° C. for 30 min. The presence or absence of bag breakage and defective appearance of the bag surface (wrinkle, whitening) was evaluated.

Example 1

Polyethylene terephthalate resin (A1) (reduced viscosity 0.75) comprising 2000 ppm of silicon dioxide (F) (manufactured by FUJI SILYSIA CHEMICAL LTD.: Silysia 310) previously added during polymerization was prepared as resin A, polybutylene terephthalate resin (B1) (reduced viscosity 1.20) and polybutylene terephthalate resin (B2) (reduced viscosity 1.10) comprising 1% of an organic phosphorus compound (manufactured by ASAHI DENKA Co., Ltd.: Adeka Stub PEP-45) were prepared as resin B, and polyester polymer (C1) which is terephthalic acid/sebacic acid//ethylene glycol/1,4-butanediol (90/10//60/40 (molar ratio), molecular weight 2000) previously. comprising 2% of talc (D) (average particle size by electron microscope method 3.5 μm) during polymerization was prepared as polyester C. They were cast into a single screw extruder (screw 65φ: UB manufactured by MITSUBISHI HEAVY INDUSTRIES, LTD.) at A1/B1/B2/C1=40/56/2/2 (parts by weight). For temperature setting of the extruder, temperatures of a feeding part (Ex1), a compressing part (Ex2), a measuring part (Ex3), the flow path up to a filter, the filter part, the flow path up to a die, and the die of the extruder were set, where Ex1 was 240° C., from Ex2 to the filter part was 260° C., and thereafter was 255° C., and resins were supplied. The temperature of the resins measured immediately after extrusion from the T-die was 258° C. A 200 mesh filter was used. The resins extruded from the T-die was rapidly cooled on a roll cooled to 20° C. according to an electrostatic adhesion method to give a non-oriented sheet having a thickness of about 200 μm. The sheet was supplied to a roll drawing machine, and drawn 3.3-fold in the longitudinal direction at 63° C. Subsequently, the sheet was transversely drawn 3.5-fold at 90° C. in a tenter, and heat set in situ at 210° C. in the tenter while relaxing by 3% in the transverse direction. The film was further led to rolls having a rotation speed difference, and heat set at 220° C. in the tenter while relaxing by 3% in the longitudinal direction to give a film having a thickness of 21 μm. The properties of the obtained film are shown in Table 1.

In addition, an adhesion modification layer was formed on one surface of the obtained polyester film by the method described in the aforementioned "7. Gas barrier property" to give a polyester film having, on its surface, a colorless and transparent vapor-deposited layer made of a mixed inorganic oxide of $SiO_2$ and $Al_2O_3$ and having a thickness of 220 Å. The properties of the obtained film were evaluated and are shown in Table 2.

Comparative Example 1

In the same manner as in Example 1 except that, after heat setting in the transverse direction, the rate of relaxation in the longitudinal direction using rolls having a rotation speed difference was set to 0.02%, a polyester film and a polyester film having a vapor-deposited layer were obtained. The properties of the obtained films were evaluated and the results are shown in Table 1 and Table 2.

Example 2

In the same manner as in Example 1 except that, after heat setting in the transverse direction, the rate of relaxation in the longitudinal direction using rolls having a rotation speed difference was set to 2%, a polyester film and a polyester film having a vapor-deposited layer were obtained. The properties of the obtained films were evaluated and the results are shown in Table 1 and Table 2.

Example 3

In the same manner as in Example 1 except that, after heat setting in the transverse direction, the rate of relaxation in the longitudinal direction using rolls having a rotation speed difference was set to 4%, a polyester film and a polyester film having a vapor-deposited layer were obtained. The properties of the obtained films were evaluated and the results are shown in Table 1 and Table 2.

Comparative Example 2

In the same manner as in Example 1 except that, after heat setting in the transverse direction, the rate of relaxation in the longitudinal direction using rolls having a rotation speed difference was set to 10%, production of a polyester film was tried. However, wrinkles were developed on the film during film formation, and the property values could not be measured.

Example 4

In the same manner as in Example 1 except that the mixing ratio of respective resins was set to A1/B1/B2/C1=75/21/2/2 (parts by weight), a polyester film and a polyester film having a vapor-deposited layer were obtained. The properties of the obtained films were evaluated and the results are shown in Table 1 and Table 2.

Example 5

In the same manner as in Example 1 except that the mixing ratio of respective resins was set to A1/B1/B2/C1=25/71/2/2 (parts by weight), a polyester film and a polyester film having a vapor-deposited layer were obtained. The properties of the obtained films were evaluated and the results are shown in Table 1 and Table 2.

Example 6

In the same manner as in Example 1 except that polytrimethylene terephthalate having a reduced viscosity of 0.83 was used instead of polybutylene terephthalate, a polyester film and a polyester film having a vapor-deposited layer were obtained. The properties of the obtained films were evaluated and the results are shown in Table 1 and Table 2.

Comparative Example 3

In the same manner as in Example 1 except that the rate of the longitudinal orientation was set to 2.5-fold and the rate of the transverse orientation was set to 2.5-fold, a polyester film and a polyester film having a vapor-deposited layer were obtained. The properties of the obtained films were evaluated and the results are shown in Table 1 and Table 2.

Comparative Example 4

In the same manner as in Example 1 except that the temperature of Ex1, Ex2, Ex3 and the flow path up to the filter, the filter part, the flow path up to the die, and the die of the extruder was set to 290° C. for all of them, a polyester film and a polyester film having a vapor-deposited layer were obtained. The properties of the obtained films were evaluated and the results are shown in Table 1 and Table 2.

TABLE 1

| | reduced viscosity (dL/g) | initial elastic modulus (GPa) (longitudinal/transverse) | thermal shrinkage (%) (longitudinal/transverse) | difference (%) in thermal shrinkage \|longitudinal − transverse\| | impact strength (J/mm) | haze (%) | appearance after printing |
|---|---|---|---|---|---|---|---|
| Ex. 1 | 0.85 | 2.7/2.8 | 0.5/0.3 | 0.2 | 65 | 3.8 | ○ |
| Ex. 2 | 0.84 | 2.8/2.9 | 0.8/0.4 | 0.4 | 66 | 3.2 | ○ |
| Ex. 3 | 0.84 | 2.8/2.9 | 0.4/0.2 | 0.2 | 65 | 3.2 | ○ |
| Ex. 4 | 0.89 | 3.8/4.2 | 0.9/0.3 | 0.6 | 63 | 3.9 | ○ |
| Ex. 5 | 0.97 | 3.0/3.1 | 0.5/0.4 | 0.1 | 72 | 3.8 | ○ |
| Ex. 6 | 0.85 | 3.1/3.2 | 0.7/0.5 | 0.2 | 60 | 3.2 | ○ |
| Comp. Ex. 1 | 0.84 | 2.7/3.1 | 2.5/0.5 | 2.0 | 62 | 3.5 | ○ |
| Comp. Ex. 2 | 0.84 | Wrinkles were developed during film formation, and measurement was unavailable. | | | | | |
| Comp. Ex. 3 | 0.84 | 1.5/1.5 | 1.3/1.1 | 0.2 | 45 | 3.5 | X printing displacement occurred |
| Comp. Ex. 4 | 0.71 | 2.3/2.2 | 0.8/0.4 | 0.4 | 35 | 3.2 | ○ |

TABLE 2

| | thermal shrinkage (%) after vapor deposition (longitudinal/transverse) | haze (%) after retort treatment | whitening | bag drop test (times) | gas barrier property of polyester film (before retort treatment) | | gas barrier property after retort treatment | |
|---|---|---|---|---|---|---|---|---|
| | | | | | oxygen transmission rate | water vapor transmission rate | oxygen transmission rate | water vapor transmission rate |
| Ex. 1 | 0.3/0.1 | 4.1 | ○ | 17 | 15 | 1.5 | 17 | 3.3 |
| Ex. 2 | 0.3/0.1 | 3.3 | ○ | 17 | 15 | 1.5 | 17 | 1.4 |
| Ex. 3 | 0.3/0.1 | 3.4 | ○ | 17 | 16 | 1.5 | 18 | 2.1 |
| Ex. 4 | 0.3/0.1 | 3.9 | ○ | 14 | 17 | 1.5 | 17 | 2.1 |
| Ex. 5 | 0.3/0.1 | 3.9 | ○ | 17 | 12 | 1.5 | 18 | 2.2 |
| Ex. 6 | 0.3/0.1 | 3.3 | ○ | 17 | 17 | 1.5 | 19 | 1.9 |

TABLE 2-continued

|  | thermal shrinkage (%) after vapor deposition (longitudinal/ transverse) | haze (%) after retort treatment | whitening | bag drop test (times) | gas barrier property of polyester film (before retort treatment) | | gas barrier property after retort treatment | |
|---|---|---|---|---|---|---|---|---|
|  |  |  |  |  | oxygen transmission rate | water vapor transmission rate | oxygen transmission rate | water vapor transmission rate |
| Comp. Ex. 1 | 1.4/0.2 | 3.6 | ○ | 15 | 21 | 2.6 | 178 | not less than 20 |
| Comp. Ex. 2 | Wrinkles were developed during film formation, and measurement was unavailable. | | | | | | | |
| Comp. Ex. 3 | 0.2/0.2 | 3.6 | ○ | 16 | 21 | 2.6 | 25 | 5.6 |
| Comp. Ex. 4 | 0.3/0.1 | 3.3 | X | 3 | 15 | 1.5 | 178 | not less than 20 |

Example 7

(Preparation of Coating Solution)

A polyester aqueous dispersion (100 parts by weight, manufactured by Toyo Boseki Kabushiki Kaisha: MD1200, solid content 30 wt %), methyl melamine (40 parts by weight, manufactured by Sumitomo Chemical Co., Ltd.: M-30W), 20 wt % aqueous dispersion (20 parts by weight) of colloidal silica particles (manufactured by Nissan Chemical Industries, Ltd.: SnowTex OL, average particle size 40 nm), water (410 parts by weight), and isopropyl alcohol (50 parts by weight) were mixed to give a coating solution having a solid content concentration of 10%.

(Formation of Film)

Polyethylene terephthalate resin (A1) (reduced viscosity 0.75) comprising 2000 ppm of silicon dioxide (F) (manufactured by FUJI SILYSIA CHEMICAL LTD.: Silysia 310) previously added during polymerization was prepared as resin A, polybutylene terephthalate resin (B1) (reduced viscosity 1.20) and polybutylene terephthalate resin (B2) (reduced viscosity 1.10) comprising 1% of an organic phosphorus compound (manufactured by ASAHI DENKA Co., Ltd.: Adeka Stub PEP-45) were prepared as resin B, and polybutylene terephthalate (C1) (copolymerized monomers: terephthalic acid/sebacic acid//ethylene glycol/1,4-butanediol) (90/10//60/40 (molar ratio) molecular weight 2000) previously comprising 2% of talc (D) (average particle size by electron microscope method 3.5 μm) during polymerization was prepared as polyester C. They were cast into a single screw extruder (screw 65φ: UB manufactured by MITSUBISHI HEAVY INDUSTRIES, LTD.) at A1/B1/B2/C1=40/56/2/2 (parts by weight). For temperature setting of the extruder, temperatures of a feeding part (Ex1), a compressing part (Ex2), a measuring part (Ex3), the flow path up to a filter, the filter part, the flow path up to a die, and the die of the extruder were set, where Ex1 was 240° C., from Ex2 to the filter part was 260° C., and thereafter was 255° C., and resins were supplied. The temperature of the resins measured immediately after extrusion from the T-die was 258° C. A 200 mesh filter was used. The resins extruded from the T-die was rapidly cooled on a roll cooled to 20° C. according to an electrostatic adhesion method to give a non-oriented sheet having a thickness of about 200 μm. The sheet was supplied to a roll drawing machine, and drawn 3.3-fold in the longitudinal direction at 63° C. Then, a coating solution was applied with a wire bar and dried by blowing hot air at 70° C. to the coated surface at 20 m/sec for 30 sec. Subsequently, the sheet was transversely drawn 3.6-fold at 88° C. in a tenter, and set in situ in the tenter at 200° C. for about 10 sec and at 220° C. for about 10 sec, while relaxing by 4% in the transverse direction to give an about 16 μm polyester film.

In addition, a polyester film having a colorless and transparent vapor-deposited layer made of a mixed inorganic oxide of $SiO_2$ and $Al_2O_3$ and having a thickness of 220 Å was obtained, which layer was formed on the surface of the easily adhesive coating layer (coated layer) of the obtained polyester film. The properties of the obtained film were evaluated and are shown in Table 3.

Example 8

In the same manner as in Example 7 except that the mixing ratio of respective resins was set to A1/B1/B2/C1=75/21/2/2 (parts by weight), a polyester film and a polyester film having a vapor-deposited layer were obtained. The properties of the obtained films were evaluated and the results are shown in Table 3.

Example 9

In the same manner as in Example 7 except that the mixing ratio of respective resins was set to A1/B1/B2/C1=25/71/2/2 (parts by weight), a polyester film and a polyester film having a vapor-deposited layer were obtained. The properties of the obtained films were evaluated and the results are shown in Table 3.

Example 10

In the same manner as in Example 7 except that the coating solution was dried by blowing hot air at 90° C. to the coated surface at 15 m/sec for 30 sec, a polyester film and a polyester film having a vapor-deposited layer were obtained.

The properties of the obtained films were evaluated and the results are shown in Table 3.

Comparative Example 5

In the same manner as in Example 7 except that the coating solution was dried by blowing hot air at 110° C. to the coated surface at 15 m/sec for 20 sec, a polyester film and a polyester film having a vapor-deposited layer were obtained. The properties of the obtained films were evaluated and the results are shown in Table 3.

Comparative Example 6

In the same manner as in Example 7 except that the coating solution was dried by blowing hot air at 70° C. to the coated surface at 35 m/sec for 30 sec, a polyester film and a polyester film having a vapor-deposited layer were obtained. The properties of the obtained films were evaluated and the results are shown in Table 3.

Example 11

In the same manner as in Example 9 except that the coating solution was prepared as shown in the following, a polyester film and a polyester film having a vapor-deposited layer were obtained.

(Preparation of Polyester Copolymer)

Dimethyl terephthalate (345 parts), 1,4-butanediol (211 parts), ethylene glycol (270 parts) and tetra-n-butyl titanate (0.5 part) were charged in a stainless steel autoclave equipped with a stirrer, a thermometer and a partial reflux condenser, and transesterification reaction was carried out from 160° C. to 220° C. over 4 hr. Then, fumaric acid (14 parts) and sebacic acid (160 parts) were added, and the temperature was raised from 200° C. to 220° C. over 1 hr to carry out esterification reaction. The temperature was raised to 255° C., the reaction system was gradually depressurized, and the reaction was carried out under reduced pressure of 0.22 mmHg for 1.5 hr to give a polyester copolymer. The obtained polyester was pale-yellow and transparent and had a weight average molecular weight of 20000.

(Self-Crosslinking Polyester Graft Copolymer)

The above-mentioned polyester copolymer resin (75 parts), methyl ethyl ketone (56 parts) and isopropyl alcohol (19 parts) were charged in a reaction vessel equipped with a stirrer, a thermometer, a reflux condenser and a titration dropping device, and the resins were dissolved by heating and stirring at 65° C. After complete dissolution of the resins, maleic anhydride (15 parts) was added to the polyester solution. Then, styrene (10 parts), and a solution of azobisdimethylvaleronitrile (1.5 parts) in methyl ethyl ketone (12 parts) were added dropwise to the polyester solution at 0.1 mL/min, and the mixture was further stirred for 2 hr. The reaction solution was sampled for analysis, and methanol (5 parts) was added. Then, water (300 parts) and triethylamine (15 parts) were added to the reaction solution, and the mixture was stirred for 1 hr. Thereafter, the inside temperature of the reaction vessel was raised to 100° C., methyl ethyl ketone, isopropyl alcohol and excess triethylamine were distilled away to give an aqueously dispersing graft-polymerization resin. The aqueously dispersing graft resin was pale-yellow and transparent and had a glass transition temperature of −10° C.

(Preparation of Coating Solution)

The aqueously dispersing graft resin and, as a polyester resin, an aqueous polyester resin obtained by copolymerization of terephthalic acid/isophthalic acid/5-sulfoisophthalic acid/ethylene glycol/1,4-butanediol at 25/20/5/25/25 (weight ratio) were diluted with water:isopropyl alcohol=9:1 (weight ratio) to a weight ratio of 90:10, solid content concentration 10% and used as a coating solution. The properties of the obtained film were evaluated. The results thereof are shown in Table 3.

Example 12

In the same manner as in Example 9 except that polytrimethylene terephthalate resin having a reduced viscosity of 0.83 was used instead of polybutylene terephthalate resin, a polyester film and a polyester film having a vapor-deposited layer was obtained. The properties of the obtained film were evaluated. The results thereof are shown in Table 3.

Comparative Example 7

In the same manner as in Example 9 except that a coating solution was not applied, a substrate film for forming a polyester film and a film having a vapor-deposited layer were obtained. The properties of the obtained film were evaluated. The results thereof are shown in Table 3.

Comparative Example 8

In the same manner as in Example 7 except that the longitudinal orientation ratio was set to 2.5-fold and the transverse orientation ratio was set to 2.5-fold, a polyester film and a film having a vapor-deposited layer were obtained. The properties of the obtained film were evaluated. The results thereof are shown in Table 3.

Comparative Example 9

In the same manner as in Example 7 except that the temperatures of Ex1, Ex2, Ex3 and the flow path up to the filter, the filter part, the flow path up to the die, and the die of the extruder was set to 290° C. for all of them, a polyester film and a film having a vapor-deposited layer were obtained.

The properties of the obtained film were evaluated. The results thereof are shown in Table 3.

TABLE 3

| | reduced viscosity (dL/g) | initial elastic modulus (GPa) (longitudinal/ transverse) | thermal shrinkage (%) (longitudinal/ transverse) | haze (%) | appearance after printing | gas barrier property after vapor deposition | | gas barrier property after vapor deposition, boiling | | impact strength (J/mm) | bag drop test (times) |
|---|---|---|---|---|---|---|---|---|---|---|---|
| | | | | | | oxygen transmission rate | water vapor transmission rate | oxygen transmission rate | water vapor transmission rate | | |
| Ex. 7 | 0.85 | 2.7/2.8 | 2.5/1.1 | 3.8 | ○ | 12 | 2.5 | 24 | 3.3 | 71 | 17 |
| Ex. 8 | 0.89 | 3.8/4.1 | 2.0/0.8 | 2.8 | ○ | 10 | 1.0 | 12 | 1.4 | 70 | 18 |
| Ex. 9 | 0.97 | 3.1/3.2 | 1.9/0.7 | 2.0 | ○ | 14 | 1.8 | 16 | 2.1 | 72 | 18 |
| Ex. 10 | 0.94 | 3.2/3.2 | 1.8/0.6 | 2.9 | ○ | 15 | 1.7 | 20 | 2.0 | 74 | 18 |
| Ex. 11 | 0.95 | 3.0/3.2 | 1.9/0.8 | 2.9 | ○ | 12 | 1.2 | 15 | 1.9 | 73 | 18 |
| Ex. 12 | 0.85 | 3.3/3.5 | 2.1/0.8 | 1.8 | ○ | 16 | 2.2 | 20 | 2.8 | 68 | 16 |

TABLE 3-continued

| | reduced viscosity (dL/g) | initial elastic modulus (GPa) (longitudinal/ transverse) | thermal shrinkage (%) (longitudinal/ transverse) | haze (%) | appearance after printing | gas barrier property after vapor deposition | | gas barrier property after vapor deposition, boiling | | impact strength (J/mm) | bag drop test (times) |
|---|---|---|---|---|---|---|---|---|---|---|---|
| | | | | | | oxygen transmission rate | water vapor transmission rate | oxygen transmission rate | water vapor transmission rate | | |
| Comp. Ex. 5 | 0.93 | 3.1/3.2 | 2.1/0.9 | 9.4 | X | 82 | 33.5 | 241 | not less than 20 | 73 | 17 |
| Comp. Ex. 6 | 0.93 | 3.1/3.1 | 2.2/0.9 | 7.2 | X | 65 | 21.3 | 195 | not less than 20 | 71 | 17 |
| Comp. Ex. 7 | 0.94 | 3.1/3.2 | 1.8/0.6 | 1.2 | ○ | 35 | 4.2 | 380 | not less than 20 | 71 | 16 |
| Comp. Ex. 8 | 0.85 | 1.6/1.6 | 1.4/0.8 | 1.8 | X | 16 | 2.2 | 20 | 2.8 | 88 | 17 |
| Comp. Ex. 9 | 0.71 | 2.7/2.7 | 1.8/0.6 | 1.2 | ○ | 35 | 4.2 | 380 | not less than 20 | 28 | 3 |

Example 13

Polyethylene terephthalate resin A1 (reduced viscosity 0.75) comprising 2000 ppm of silicon dioxide (F) (manufactured by FUJI SILYSIA CHEMICAL LTD.: Silysia 310) previously added during polymerization as resin A and polybutylene terephthalate resin B1 (reduced viscosity 1.20) as resin B were cast into a single screw extruder (65φ) at resin A1/resin B1=60/40 (parts by weight). For temperature setting of the extruder, temperatures of a feeding part (Ex1), a compressing part (Ex2), a measuring part (Ex3), the flow path up to a filter, the filter part, the flow path up to a die, and the die of the extruder were set, where Ex1 was 240° C., from Ex2 to the filter part was 260° C., and thereafter was 255° C., and resins were supplied. The temperature of the resins measured immediately after extrusion from the T-die was 258° C. A 200 mesh filter was used. The resins extruded from the T-die was rapidly cooled on a roll cooled to 20° C. according to an electrostatic adhesion to give a non-oriented film having a thickness of about 200 μm. The film was supplied to a roll drawing machine, and drawn 3.3-fold in the longitudinal direction at 80° C. Subsequently, the sheet was transversely drawn 3.6-fold at 95° C. in a tenter, and heat set in situ at 200° C. for about 10 seconds and at 210° C. for about 10 seconds in the tenter while relaxing by 6% in the transverse direction to give a polyester film having a thickness of about 16 μm. The properties of the obtained film were evaluated. The results thereof are shown in Table 4.

Example 14

In the same manner as in Example 13 except that the starting material was resin A1/resin B1=85/15 (parts by weight), the temperature conditions of extrusion step were set to 250° C. for Ex1, 270° C. from Ex2 to the filter part, and 255° C. thereafter, the orientation temperature in the longitudinal direction was set to 110° C., and the orientation temperature in the transverse direction was set to 120° C., a polyester film was obtained. The properties of the obtained film were evaluated. The results thereof are shown in Table 4.

Example 15

In the same manner as in Example 13 except that the starting material was resin A1/resin B1=40/60 (parts by weight), the orientation temperature in the longitudinal direction was set to 65° C., and the orientation temperature in the transverse direction was set to 85° C., a polyester film was obtained. The properties of the obtained film were evaluated. The results thereof are shown in Table 4.

Example 16

In the same manner as in Example 13 except that the starting material was resin A1/resin B1=15/85 (parts by weight), the orientation temperature in the longitudinal direction was set to 55° C., and the orientation temperature in the transverse direction was set to 75° C., a polyester film was obtained. The properties of the obtained film were evaluated. The results thereof are shown in Table 4.

Comparative Example 10

In the same manner as in Example 13 except that polyethylene terephthalate resin A2 (reduced viscosity 0.65) comprising 2000 ppm of silicon dioxide (F) (manufactured by FUJI SILYSIA CHEMICAL LTD.: Silysia 310) previously added during polymerization was used as resin A and polybutylene terephthalate resin B2 (reduced viscosity 0.75) was used as resin B and they were used at resin A2/resin B2=60/40 (parts by weight), a polyester film was obtained. The properties of the obtained film were evaluated. The results thereof are shown in Table 4.

Comparative Example 11

In the same manner as in Example 13 except that the starting material was resin A1/resin B1=95/5 (parts by weight), the temperature conditions of extrusion step were set to 250° C. for Ex1, 275° C. from Ex2 to the filter part, and 255° C. thereafter, the orientation temperature in the longitudinal direction was set to 110° C., and the orientation temperature in the transverse direction was set to 125° C., a polyester film was obtained. The properties of the obtained film were evaluated. The results thereof are shown in Table 4.

Comparative Example 12

In the same manner as in Example 13 except that the temperature conditions of extrusion step were set to 280° C. from Ex2 to the filter part, and 255° C. thereafter, and the heat setting treatment after transverse orientation was applied at 190° C. for about 10 seconds and at 195° C. for about 10 seconds, a polyester film was obtained. The properties of the obtained film were evaluated. The results thereof are shown in Table 4.

Comparative Example 13

In the same manner as in Example 13 except that the heat setting treatment after transverse orientation was applied at 225° C. for about 10 seconds and at 235° C. for about 10 seconds, a polyester film was obtained. The properties of the obtained film were evaluated. The results thereof are shown in Table 4.

Comparative Example 14

In the same manner as in Example 13 except that, as the conditions of the extruder, the temperature was set to 285° C. from Ex2 to the filter part and 2755° C. thereafter, a polyester film was prepared. The temperature of the resin immediately after T-die was 278° C. The properties of the obtained film were evaluated. The results thereof are shown in Table 4.

resistance, bag breakage resistance on dropping, impact resistance and the like, fields requiring thermoforming or vacuum forming, and uses such as packaging bags for water-containing food, pharmaceutical products and the like.

The invention claimed is:

1. A polyester film having an initial elastic modulus in at least one direction of 2.5-10 GPa, an impact strength of 40-10000 J/mm, a thermal shrinkage in at least one direction at 150° C. of −0.5% to 6% and a haze of 0.001% to 7%, wherein the absolute value of the difference in the thermal shrinkage between the longitudinal direction and the transverse direction of the substrate film is not more than 1.1%.

2. The polyester film of claim 1, which is made of a polyester resin composition comprising 10-90 wt % of polyethylene terephthalate resin (A), and 90-10 wt % of a polybutylene terephthalate resin and/or polytrimethylene terephthalate resin (B).

3. The polyester film of claim 2, wherein the polyester film has a reduced viscosity of not less than 0.80.

TABLE 4

|  |  | Ex. 13 | Ex. 14 | Ex. 15 | Ex. 16 | Comp. Ex. 10 | Comp. Ex. 11 | Comp. Ex. 12 | Comp. Ex. 13 | Comp. Ex. 14 |
|---|---|---|---|---|---|---|---|---|---|---|
| starting material polyester resin | A1 | 60 | 85 | 40 | 15 | — | 95 | 60 | 60 | 60 |
|  | A2 | — | — | — | — | 60 | — | — | — | — |
|  | A3 | 40 | 15 | 60 | 85 | — | 5 | 40 | 40 | 40 |
|  | A4 | — | — | — | — | 40 | — | — | — | — |
| extruder compressing part temperature | (° C.) | 260 | 270 | 260 | 260 | 260 | 275 | 280 | 260 | 285 |
| die outlet resin temperature | (° C.) | 258 | 260 | 258 | 258 | 258 | 260 | 276 | 258 | 278 |
| heat setting treatment temperature | (° C.) | 200/210 | 200/210 | 200/210 | 200/210 | 200/210 | 200/210 | 190/195 | 225/235 | 200/210 |
| reduced viscosity | (dL/g) | 0.84 | 0.76 | 0.89 | 1.05 | 0.71 | 0.73 | 0.74 | 0.84 | 0.72 |
| initial elastic modulus (longitudinal/transverse) | (GPa) | 3.4/3.6 | 3.8/3.9 | 3.2/3.1 | 2.6/2.8 | 3.3/3.4 | 4.2/4.5 | 3.4/3.6 | 3.5/3.7 | 3.6/3.7 |
| impact strength | (J/mm) | 52 | 47 | 55 | 59 | 33 | 43 | 44 | 35 | 38 |
| haze | (%) | 3.2 | 2.7 | 3.5 | 3.8 | 3.4 | 2.8 | 3.5 | 4.5 | 4.0 |
| thermal shrinkage (150° C., 30 min (longitudinal/transverse) | (%) | 3.2/2.9 | 3.3/2.9 | 3.3/3.0 | 3.2/3.0 | 3.2/3.0 | 3.3/3.0 | 6.1/6.4 | 1.3/1.2 | 3.2/3.0 |
| Gelbo test evaluation | (pinholes) | 2 | 3 | 1 | 0 | 5 | 8 | 3 | 6 | 5 |
| bag drop breakage frequency | (times) | 17 | 18 | 17 | 18 | 8 | 9 | 13 | 5 | 6 |
| boil evaluation | (appearance) | fine | fine | fine | fine | fine | fine | curled | fine | fine |
| retort evaluation | (appearance) | fine | fine | fine | fine | whitened | fine | fine | fine | whitened |
| gravure printing evaluation | (appearance) | fine | fine | fine | fine | fine | fine | pitch lag | fine | fine |

While the polyester film of the present invention has been described based on plural Examples in the above, the present invention is not limited to the constitutions described in the Examples above, but rather, various changes may be made to the constitution as appropriate without departing from the gist of the present invention, such as appropriate combination of the constitutions described in respective Examples and the like.

INDUSTRIAL APPLICABILITY

As mentioned above, since the polyester film of the present invention is characteristically superior in mechanical strength, heat resistance, chemical resistance, insulation property and thermal dimensional stability, it can be preferably used for the fields associated with boiling or retort treatment, which require tenacity, pinhole resistance, bending

4. The polyester film of claim 2, which is used as a packaging material.

5. The polyester film of claim 1, wherein the polyester film has a reduced viscosity of not less than 0.80.

6. The polyester film of claim 5, which is used as a packaging material.

7. The polyester film of claim 1, wherein the thermal shrinkage in the longitudinal direction and the transverse direction at 150° C. of the substrate film is each 0% to 4%.

8. The polyester film of claim 1, wherein the number of pinholes formed by bending the substrate film 1000 times at 23° C. in a Gelbo-Flex test is not more than 5.

9. The polyester film of claim 1, wherein at least one surface of the film has at least one surface treatment layer selected from a coating layer, a corona discharge treatment layer, a vapor-deposited metal layer, a vapor-deposited inorganic oxide layer and an ink printed layer.

10. The polyester film of claim 9, wherein the coating layer is a easily adhesive coating layer composed of a coating solution comprising at least binder (C) and hardener (D).

11. The polyester film of claim 9, which is obtained by applying a coating solution for forming the an easily adhesive coating layer, and then subjecting the resulting film to at least uniaxial orientation.

12. The polyester film of claim 1, which is used as a packaging material.

* * * * *